US008254228B2

United States Patent
Yamada et al.

(10) Patent No.: US 8,254,228 B2
(45) Date of Patent: Aug. 28, 2012

(54) OPTICAL DISC DRIVE AND HIBERNATION RECOVERY METHOD FOR AN OPTICAL DISC DRIVE

(75) Inventors: Atsushi Yamada, Saitama (JP); Atsushi Fuchiwaki, Yokohama (JP); Norimoto Ichikawa, Fujisawa (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 304 days.

(21) Appl. No.: 12/768,955

(22) Filed: Apr. 28, 2010

(65) Prior Publication Data

US 2010/0278024 A1 Nov. 4, 2010

(30) Foreign Application Priority Data

Apr. 30, 2009 (JP) ................................. 2009-110999

(51) Int. Cl.
G11B 7/00 (2006.01)
(52) U.S. Cl. .................. 369/47.42; 369/47.11
(58) Field of Classification Search .......... None
See application file for complete search history.

(56) References Cited

U.S. PATENT DOCUMENTS

| | | | | |
|---|---|---|---|---|
| 6,647,472 B2 * | 11/2003 | Atkinson et al. | ............. | 711/158 |
| 6,694,451 B2 * | 2/2004 | Atkinson | ........................ | 714/15 |
| 7,480,788 B2 * | 1/2009 | Suzuki | .......................... | 712/225 |
| 2004/0163004 A1 * | 8/2004 | Kardach et al. | ............... | 713/323 |
| 2004/0163005 A1 * | 8/2004 | Kardach et al. | ............... | 713/323 |
| 2006/0221781 A1 * | 10/2006 | Suzuki | ........................ | 369/32.01 |
| 2007/0143539 A1 * | 6/2007 | Ichikawa | ...................... | 711/113 |
| 2008/0005541 A1 * | 1/2008 | Hase et al. | ..................... | 712/228 |
| 2010/0278024 A1 * | 11/2010 | Yamada et al. | ............ | 369/47.49 |

FOREIGN PATENT DOCUMENTS

| JP | 2007-164915 | 6/2007 |
|---|---|---|
| JP | 2009-003831 | 1/2009 |

* cited by examiner

*Primary Examiner* — Peter Vincent Agustin
(74) *Attorney, Agent, or Firm* — Antonelli, Terry, Stout & Kraus, LLP.

(57) ABSTRACT

Provided is a technology in which a controller for controlling read/write performed to/from an optical disc includes a processor for controlling an interface, a temporary memory unit, a rotation control unit, and an optical control unit. The controller causes the processor to shift to a hibernate state when a predetermined condition is satisfied, and causes the processor to recover from the hibernate state into an active state when the interface receives a first command. The processor receives the first command from the interface, instructs the rotation control unit to drive the optical disc at a predetermined target rotational speed, instructs the optical control unit to perform a processing specified by the first command, transmits a completion notification of the first command to the interface with a delay, receives a second command after transmitting the completion notification of the first command, and executes the processing of the second command.

14 Claims, 7 Drawing Sheets

OPTICAL DISC DRIVE AND HIBERNATION RECOVERY METHOD FOR AN OPTICAL DISC DRIVE

CLAIM OF PRIORITY

The present application claims priority from Japanese patent application JP2009-110999 filed on Apr. 30, 2009, the content of which is hereby incorporated by reference into this application.

BACKGROUND

This invention relates to an optical disc drive and a computer system including an optical disc drive, and more particularly, to a control technology for recovering from a standby state to an active state on an optical disc drive for achieving power savings by shifting to the standby state or a hibernate state.

In recent years, demand has grown for computer systems having reduced power consumption as well as improved processing capabilities. Therefore, a power saving technology as disclosed in JP 2007-164915 A is known for an optical disc drive. In the power saving technology, the optical disc drive is caused to shift to a hibernate state (suspend state or power saving state) such as a sleep state during a period during which no access is made from a host computer.

Upon reception of a write command or a read command from the host computer in the hibernate state, the optical disc drive causes a stopped optical disc to rotate and starts a processing corresponding to the received command after a predetermined rotational speed is reached. Here, on the optical disc drive, a rotational speed of the stopped optical disc is raised to a predetermined rotational speed and a writing test or other such processing is performed to thereby cause a delay until the writing or the reading is started. A delay time that passes until the optical disc drive recovers from the hibernate state may cause a time-out in an OS or the like running on the host computer.

JP 2009-3831 A discloses a technology as an example of a technology as described above for preventing the time-out on the host computer accompanied by the recovery from the hibernate state. In the technology, a time-out period is set in advance for each host computer, and during the recovery from the hibernate state, the rotational speed of the optical disc is changed so that the processing corresponding to the command from the host computer can be started within the time-out period.

SUMMARY

Known for the optical disc drive including a cache memory is a technology for notifying the host computer that has issued a write request of the completion of the write request at a time when writing of data into the cache memory is completed. The optical disc drive can improve efficiency of the processing by freeing the host computer from a write processing before the actual writing onto the optical disc is completed.

The optical disc drive that sends a completion notification to the write request at a time when the data is written into the cache memory may raise the following problems when recovering from the hibernate state. First, the optical disc drive receives the write request from the host computer, recovers from the sleep state, and performs a rotation start (spin-up) of the optical disc and writing of data into the cache memory. At the time when the writing of the data into the cache memory is completed, the optical disc drive notifies the host computer of the write completion. At this time, a rotational speed of the optical disc has not yet reached a value of a writable rotational speed, but the optical disc drive is ready to receive another command, and if a read request is received as a second command from the host computer, the two commands, in other words, the write request and the read request are in a waiting state.

Several seconds or more are taken until the rotational speed of the optical disc reaches the value of the writable rotational speed. Therefore, there is a problem that the time-out may occur for a read processing on the host computer after the completion of the write processing serving as a trigger for the recovery from the hibernate state before the read processing serving as the second command is completed.

In JP 2009-3831 A according to the conventional example, the time-out period is set in advance for each host computer, and the rotational speed is decided so that the writable rotational speed can be reached within the time-out period. However, in a case where the optical disc drive notifies the host computer of the write completion at the time when the writing of the data into the cache memory is completed, when the optical disk drive recovers from the hibernate state and receives the second command, there is a problem that the time-out may occur on the host computer before the second command is completed.

Further, the technology disclosed in JP 2009-3831 A is configured to have the time-out period set in advance. Hence, a time required to reach a predetermined rotational speed after the suspend state may vary depending upon variations of precision in mechanical parts, and the predetermined rotational speed cannot be reached within the time-out period set in advance, which raises a fear that the time-out may occur.

Therefore, this invention has been made in view of the above-mentioned problems, and an object thereof is to provide an optical disc drive for outputting a completion notification before writing of data onto an optical disc is completed, which can prevent a time-out from occurring on a host computer when a second command is received before writing is completed after the optical disc drive receives a write request and recovers from a hibernate state, and can further prevent the time-out from occurring due to variations of precision in mechanical parts.

A representative aspect of this invention is as follows.

An optical disc drive, comprising: a controller for controlling access performed to an optical disc; and an actuator for driving the optical disc by being controlled by the controller, the controller comprising: an interface for performing one of transmitting and receiving a command issued from external and data; a temporary memory unit for temporarily storing the data; a rotation control unit for controlling the actuator; an optical control unit for performing one of writing to the optical disc and reading from the optical disc; a processor for controlling the interface, the temporary memory unit, the rotation control unit, and the optical control unit; and a hibernation control unit for controlling the processor to shift to a hibernate state when a predetermined condition is satisfied and controlling the processor to recover from the hibernate state into an active state when the interface receives a first command, wherein: the hibernation control unit controls the processor to recover into the active state when the processor is in the hibernate state and the interface receives the first command; and the processor is configured to: receive the first command from the interface and instruct the rotation control unit to drive the optical disc at a predetermined target rotational speed; instruct the optical control unit to perform one of the read and write specified by the first command; transmit a completion notification of the first command to the interface with a delay; and receive a second command after transmitting the delayed completion notification of the first command and instruct the optical control unit to perform one of the read and write specified by the second command.

Further, the processor is configured to: receive the first command from the interface and store data specified by the first command into the temporary memory unit; instruct the rotation control unit so that a rotational speed of the optical disc becomes the predetermined target rotational speed; transmit the completion notification of the first command to the interface when a rotation state of the optical disc becomes a predetermined rotation state; detect the rotational speed of the optical disc and instruct the optical control unit to execute one of the read and write specified by the first command by using the data stored in the temporary memory unit when the detected rotational speed reaches the predetermined target rotational speed; receive the second command from the interface after outputting the delayed completion notification of the first command to the interface; and instruct the optical control unit to perform one of the read and write specified by the second command after one of the read and write specified by the first command is completed.

Therefore, according to an exemplary embodiment of this invention, after recovering from the hibernate state, the optical disc drive transmits the completion notification regarding the first command from the interface to an external computer with a delay to thereby delay a timing for becoming ready to receive the second command, while the rotational speed of the optical disc is caused to reach the target rotational speed, and the optical disc drive performs the processing of the first command and then performs the processing of the second command. This allows the first command and the second command to be processed within a time-out period of the computer after the recovery from the hibernate state, which can prevent the time-out from occurring on the computer.

DETAILED DESCRIPTION OF THE PREFERRED EMBODIMENTS

Hereinafter, description is made of embodiments of this invention with reference to the accompanying drawings.

First Embodiment

Figure 1:
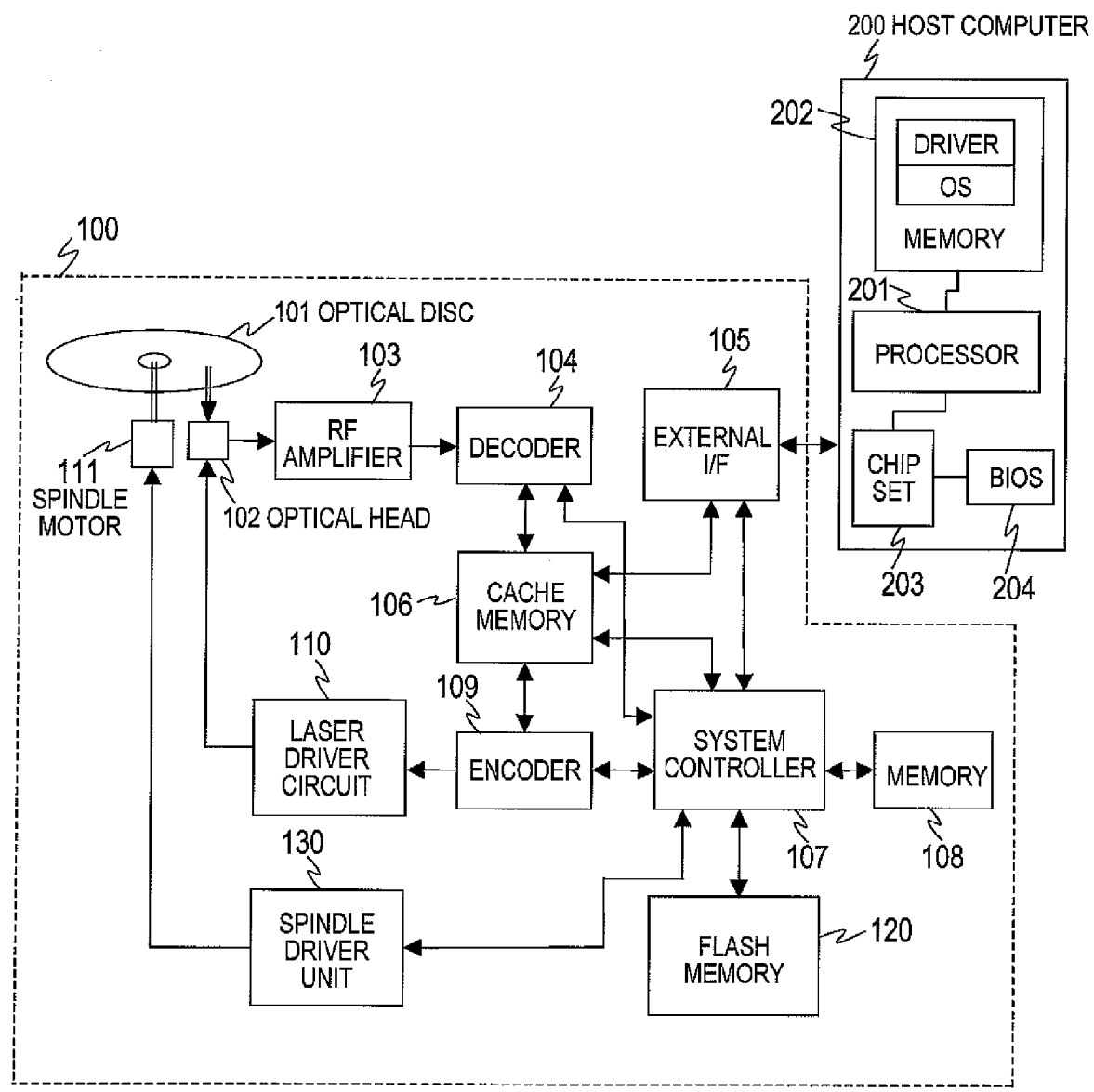
FIG. 1 is a block diagram illustrating a configuration of an optical disc drive 100 according to a first embodiment of this invention.

FIG. 1 is a block diagram illustrating a configuration of an optical disc drive 100 according to a first embodiment of this invention.

The optical disc drive 100 according to this embodiment includes an optical head 102, an RF amplifier 103, a decoder 104, an external interface 105, a cache memory 106, a system controller 107, a memory 108, flash memory 120 (non-volatile storage medium), an encoder 109, a laser driver circuit 110, spindle driver unit 130, and a spindle motor (actuator) 111.

The optical disc drive 100 is coupled to a host computer 200 via the external interface 105. The optical disc drive 100 writes data input from the host computer 200 onto a writable optical disc 101 (for example, CD-R), and outputs the data read from the optical disc 101 to the host computer 200. The spindle motor 111 drives the optical disc 101 to rotate according to an instruction from the spindle driver unit 130.

At a time of a reading operation in which the data is read from the optical disc 101, the optical head 102 irradiates the optical disc 101 with weak laser light, reads the data recorded (written) on the optical disc 101 based on reflected light of the laser light, and outputs an RF signal corresponding to the reflected light. Further, at a time of a writing operation in which the data is recorded onto the optical disc 101, the optical head 102 irradiates the optical disc 101 with laser light stronger than the laser light applied in the reading. The optical disc 101 has data recorded thereon when a recording pit is formed on a recording layer by a phase change due to heat generated in a portion irradiated with the laser light while changing a reflectance of the recording layer.

The RF amplifier 103 amplifies the RF signal output from the optical head 102, and outputs the amplified RF signal as digital data. The decoder 104 decodes the digital data output from the RF amplifier 103 according to a format determined for each kinds of optical disc, and temporarily stores the decoded data into the cache memory 106 after performing error detection and error correction. The cache memory 106 functions as a temporary memory area.

The external interface 105 controls one of transmission and reception of the data to/from the host computer 200 coupled to the optical disc drive 100. The cache memory 106 temporarily stores the data that is to be recorded onto the optical disc 101 from the host computer 200 via the external interface 105.

The encoder 109 encodes the data input from the host computer 200 and temporarily stored in the cache memory 106 according to the format determined for each kinds of optical disc. The laser driver circuit 110 outputs a drive signal for driving a laser light source of the optical head 102.

The system controller 107 is a microprocessor for controlling an operation of the optical disc drive 100, reads a control program (firmware) stored in the flash memory 120 into the memory 180, and controls operations of the decoder 104, the encoder 109, and the external interface 105. Further, the system controller 107 controls reading of the data temporarily stored in the cache memory 106 and writing of the data into the cache memory 106. Further, the system controller 107 analyzes a command received from the host computer 200, and performs a processing according to the analyzed command.

When the external interface 105 receives a command from the host computer 200, the system controller 107 controls the spindle driver unit 130, the laser driver circuit 110, the optical head 102, and the RF amplifier 103 to execute a processing corresponding to the command. It should be noted that the laser driver circuit 110, the RF amplifier 103, the decoder 104, and the encoder 109 function as an optical control unit for controlling one of read and write with respect to the optical disc 101.

Further, the system controller 107 has a power saving function. When a read operation and write operation is not being performed, if no access request is received from the host computer 200 even after a predetermined time has elapsed, it is judged that a predetermined condition for performing power saving control is satisfied. Then, the spindle motor 111 is caused to stop, the system controller 107 is caused to hibernate, and an optical disc drive 100 is caused to shift to a hibernate state. In the hibernate state of the optical disc drive 100, the external interface 105, the memory 108, and the laser driver circuit 110 maintains a driven state, staying ready for the recovery from the hibernate state. It should be noted that the hibernate state of the system controller 107 represents a mode for reducing power consumption (power saving mode), which indicates, for example, slowing down or stop of a clock or a drop in drive voltage.

In the hibernate state of the optical disc drive 100, when the external interface 105 receives a predetermined command from the host computer 200, the system controller 107 is caused to recover into an active state, and the spindle driver unit 130 drives the spindle motor 111 to start one of the read and write. It should be noted that the command serving as a trigger that causes the system controller 107 to recover from the hibernate state into the active state is a preset command such as a write command or a read command. The external interface 105 may include an interrupting controller for interrupting the system controller 107 when the command is received from the host computer 200.

It should be noted that when a shift is made from the hibernate state into the active state, the system controller 107 instructs the spindle driver unit 130 to cause the optical disc 101 to rotate at a predetermined rotational speed (hereinafter, referred to as "target rotational speed tFr"). The spindle driver unit 130 performs servo control on the spindle motor 111 to have the target rotational speed tFr specified in the instruction issued from the system controller 107. As the servo control, a publicly-known or well-known technology may be applied. For example, in a case where the spindle motor 111 includes a frequency generator, the servo control is performed so that the target rotational speed tFr can be achieved at a rotational frequency detected by the spindle motor 111. Alternatively, in a case where the optical disc 101 is a DVD, the servo control can be performed so that the rotational speed of the optical disc 101 becomes the target rotational speed tFr by a wobble signal detected by the optical head 102.

The host computer 200 includes a processor 201 for performing operation processes, a memory 202 for storing an OS and a driver, a chip set 203 for coupling the processor 201 and an I/O device, and a BIOS 204 (or EFI) that defines input/output procedures for hardware resources of the host computer 200. When the host computer 200 is booted, the processor 201 reads the BIOS 204 to recognize the hardware resources, and notifies the OS to be booted of the recognized hardware resources and the input/output procedures. The OS reads the driver corresponding to each of the hardware resources recognized by the BIOS 204, and uses the hardware resources. It should be noted that in this embodiment, the OS within the memory 202 reads the driver for the optical disc drive 100, and instructs the optical disc drive 100 to perform one of the read and write.

When the optical disc drive 100 is started, the system controller 107 of the optical disc drive 100 reads a control program stored in the flash memory 120 into the memory 108 to execute the processing of each of the above-mentioned components.

Figure 2:
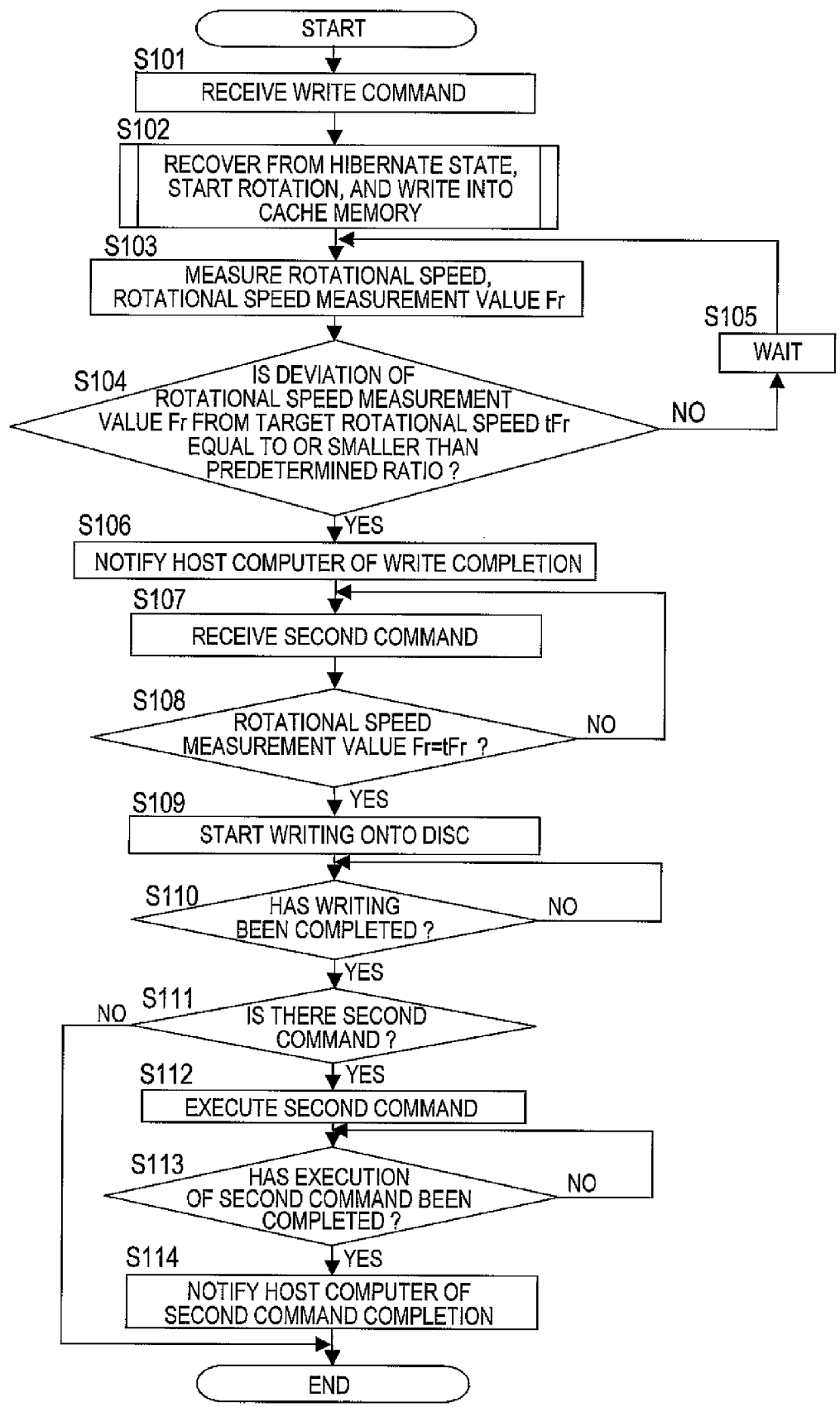
FIG. 2 is a flowchart illustrating an example of the control performed mainly by the system controller according to the first embodiment of this invention.

FIG. 2 is a flowchart illustrating an example of the control performed mainly by the system controller 107 when the optical disc drive 100 shifts from the hibernate state to the active state. The example of FIG. 2 indicates a case where the optical disc drive 100 recovers into the active state upon reception of the write command from the host computer 200 and receives the read command as a second command from the host computer 200 after the notification of the write completion.

In Step S101, the external interface 105 of the optical disc drive 100 receives a write command from the host computer 200. In Step S102, with a trigger of the external interface 105 receiving the write command, the system controller 107 is caused to shift from the hibernate state to the active state. The recovery of the system controller 107 from the hibernate state is realized by an interruption or the like as described above.

When recovering into the active state, the system controller 107 instructs the spindle driver unit 130 to cause the optical disc 101 to recover from a suspend state and rotate at the preset target rotational speed tFr. Further, the system controller 107 transfers data to be written corresponding to the write command from the external interface 105, and writes the data into the cache memory 106. However, at a time of the recovery from the suspend state, even if the writing of the data corresponding to the write command into the cache memory 106 is completed, the system controller 107 holds a notification that the writing of the data onto the optical disc 101 is completed (write completion notification) which is to be transmitted to the host computer 200.

In Step S103, the spindle driver unit 130 measures the rotational speed (or rotational frequency) under the above-mentioned servo control, and the system controller 107 acquires from the spindle driver unit 130 a measurement value of the rotational speed of the optical disc 101 as a rotational speed measurement value Fr.

In Step S104, the system controller 107 makes a comparison between the rotational speed measurement value Fr and the target rotational speed tFr, and judges whether or not a difference (deviation) ΔFr between the target rotational speed tFr and the rotational speed measurement value Fr is equal to or smaller than a predetermined ratio Rth with respect to the target rotational speed tFr.

In other words, the system controller 107 judges whether or not the following expression is satisfied:

$$\Delta Fr = (tFr - Fr)/Fr \times 100 \leq Rth$$

Figure 4:
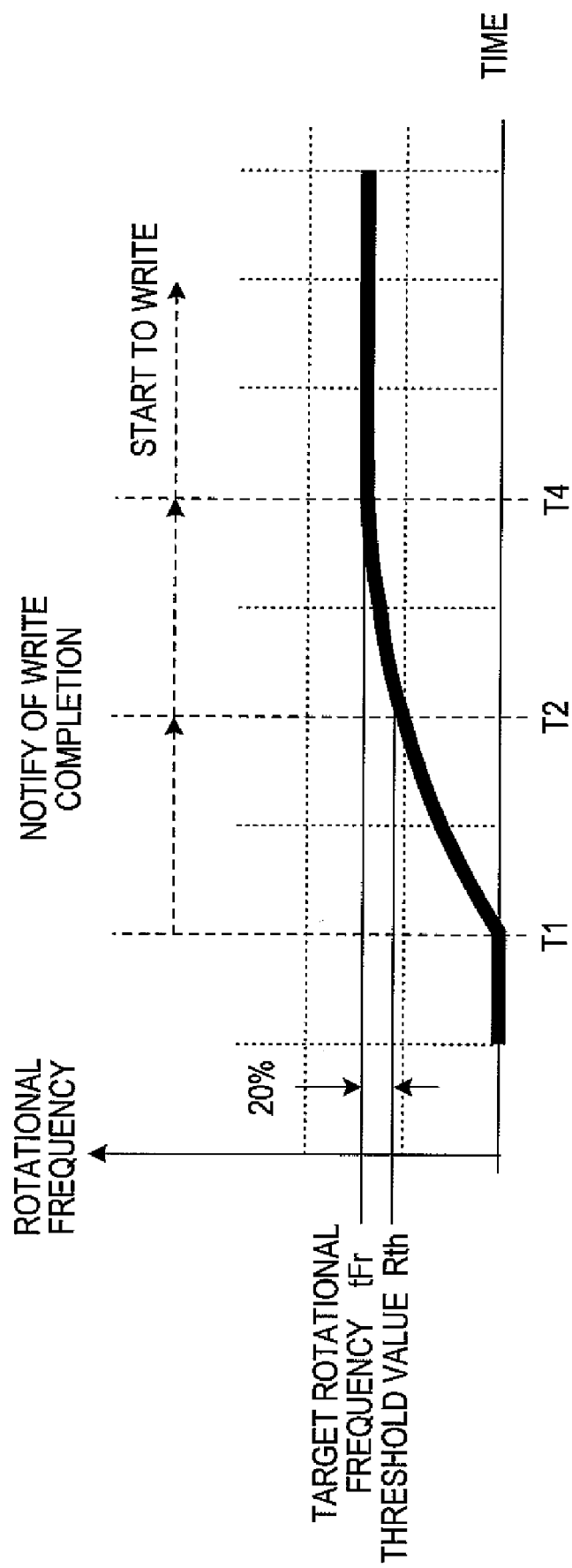
FIG. 4 is a graph illustrating a relationship between the rotational speed of the optical disc 101 and time according to the first embodiment of this invention.

The predetermined ratio Rth is set to a desired value of for example, 20% through 50%, and as illustrated in FIG. 4, set to a value corresponding to approximately half of a time between a time instant T1 at which the write command is transmitted and a time instant T4 at which the rotational speed of the optical disc 101 in the suspend state reaches the target rotational speed tFr. FIG. 4 is a graph illustrating a relationship between the rotational speed of the optical disc 101 and time. In the example of FIG. 4, the predetermined ratio Rth=20%. The predetermined ratio Rth may be appropriately set according to specifications of the spindle motor 111 of the optical disc drive 100, specifications of mechanical parts, or specifications of the spindle driver unit 130 and a time-out period of the OS running on the host computer 200.

In Step S104, if the difference ΔFr of the current rotational speed measurement value Fr with respect to the target rotational speed tFr is equal to or smaller than the predetermined ratio Rth, the system controller 107 advances to Step S106, in which the system controller 107 transmits the write completion notification held above in Step S103 to the host computer 200 via the external interface 105.

On the other hand, if the deviation ΔFr of the rotational speed measurement value Fr is larger than the predetermined ratio Rth, the system controller 107 stands by temporarily in Step S105 and then returns to Step S103. Then, the system controller 107 repeats the acquisition of the rotational speed measurement value Fr and its comparison with the target rotational speed tFr.

In Step S106, the notification of the completion of the writing onto the optical disc 101 is transmitted to thereby cause the host computer 200 to complete the write processing and to be ready to issue the next command with respect to the optical disc drive 100.

In Step S107, the system controller 107 receives a new command (second command) from the host computer 200 via the external interface 105.

In Step S108, the system controller 107 acquires the rotational speed measurement value Fr from the spindle driver unit 130 to judge whether or not the target rotational speed tFr has been reached. As to whether or not the rotational speed measurement value Fr of the optical disc drive 100 has reached the target rotational speed tFr, it is judged that a steady-state rotation (stable rotation) state in which the target rotational speed tFr is reached has been achieved if the rotational speed measurement value Fr is within a predetermined error range (for example, ±1%) with respect to the target rotational speed tFr, and the system controller 107 advances to the processing of Step S109.

On the other hand, if the rotational speed measurement value Fr is not within the predetermined error range (for example, ±1%) with respect to the target rotational speed tFr, the system controller 107 judges that the steady-state rotation state has not been achieved, and returns to Step S107. Then, the system controller 107 repeats the reception of the second command and the judgment for the steady-state rotation state. In other words, after Step S106, the system controller 107 keeps receiving the second command until the rotational speed measurement value Fr of the optical disc 101 achieves the steady-state rotation state.

In Step S109, in which the rotational speed of the optical disc 101 has achieved the steady-state rotation state, the system controller 107 instructs the laser driver circuit 110 to start the writing, and writes the data stored in the cache memory 106 onto the optical disc 101. In Step S110, the system controller 107 judges whether or not all the data stored in the cache memory 106 has been written onto the optical disc 101, and continues monitoring until the writing onto the optical disc 101 is completed. When the writing is completed, the system controller 107 advances to Step S111.

In Step S111, the system controller 107 judges whether or not the second command has been received in the above-mentioned Step S107. If the second command has been received, the system controller 107 advances to Step S112, and if has not received the second command, the system controller 107 ends the processing.

In Step S112, the processing of the second command is executed. If the second command is, for example, the read command, the system controller 107 instructs the laser driver circuit 110 and the decoder 104 to perform the reading, and transmits the data read into the cache memory 106 to the host computer 200 via the external interface 105. In Step S113, the system controller 107 judges whether or not the processing of the second command has been completed. If the processing has been completed, the system controller 107 advances to Step S114, and if the processing has not been completed, the system controller 107 stands by.

In Step S114, the system controller 107 transmits a completion notification of the second command to the host computer 200, and completes the recovery processing from the hibernate state.

When the system controller 107 receives the write command after the recovery processing from the hibernate state is completed, the system controller 107 transmits a notification that the writing onto the optical disc 101 has been completed to the host computer 200 at a time when the data to be written is written into the cache memory 106. Further, if no access request is received from the host computer 200 even after a predetermined time has elapsed, the system controller 107 causes the optical disc drive 100 to shift to the hibernate state to thereby achieve power savings.

By the above-mentioned processing, after recovering from the hibernate state by the write command, the system controller 107 transmits the write completion notification to the host computer 200 at the time when the rotational speed measurement value Fr of the optical disc 101 becomes equal to or larger than the predetermined ratio with respect to the target rotational speed tFr (i.e., when the difference ΔFr becomes equal to or smaller than the predetermined ratio Rth with respect to the target rotational speed tFr). In other words, in the steady-state rotation state, when the system controller 107 receives the write command, the write completion notification is transmitted to the host computer 200 at the time when the writing of the data into the cache memory 106 is completed. Meanwhile, after the recovery from the hibernate state, even if the data is written into the cache memory 106 after reception of the write command, the system controller 107 holds the write completion notification to be transmitted to the host computer 200. Then, the system controller 107 transmits the write completion notification that has been held to the host computer 200 after the rotational speed measurement value Fr of the optical disc 101 becomes equal to or larger than the predetermined ratio with respect to the target rotational speed tFr.

Accordingly, it is possible to complete the processing of the command received by the optical disc drive 100 after the recovery from the hibernate state while preventing a time-out from occurring on the host computer 200. Further, during the recovery processing from the hibernate state, a timing for becoming ready to receive the second command from the host computer 200 is delayed until the rotational speed measurement value Fr becomes equal to or larger than the predetermined ratio with respect to the target rotational speed tFr. Hence, as in the conventional example, it is possible to reliably prevent the time-out from occurring in the processing of the second command during the recovery processing from the hibernate state.

It should be noted that a preset value is used for the target rotational speed tFr included in the instruction issued to the spindle driver unit 130 by the system controller 107 according to each of types (including CD-R, DVD-R/RW, DVD+R/RW, and BD-R) of the optical disc drive 100.

Figure 3:
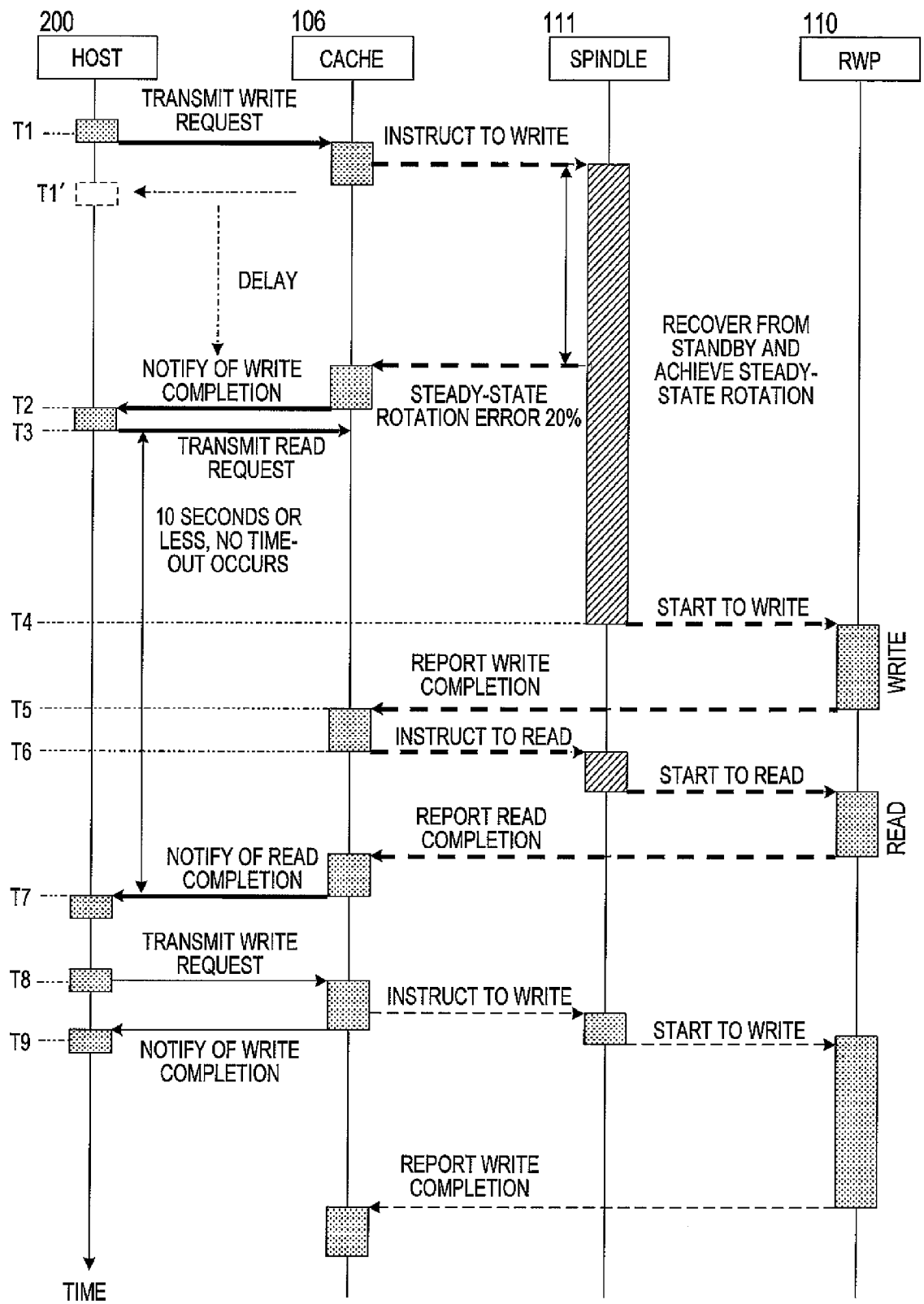
FIG. 3 is a sequential diagram illustrating an example of operations of the host computer 200 and the optical disc drive 100 according to the first embodiment of this invention.

FIG. 3 is a sequential diagram illustrating an example of operations of the host computer 200 and the optical disc drive 100 performed by the processing of the flowchart illustrated in FIG. 2. This example indicates a case where the optical disc drive 100 recovers from the hibernate state upon reception of the write command, and receives the read command as the second command during the recovery processing from the hibernate state. It should be noted that in FIG. 3, RWP represents a read/write power, which corresponds to the laser driver circuit 110.

When the optical disc drive 100 is in the hibernate state, the host computer 200 transmits the write command at the time instant T1. Upon reception of the write command, the system controller 107 recovers from the hibernate state, and causes the respective components in the hibernate state to shift to the active state. The system controller 107 instructs the spindle driver unit 130 to cause the stopped optical disc 101 to start rotating at the target rotational speed tFr. Further, the system controller 107 receives the data corresponding to the write command from the host computer 200, and writes the data into the cache memory 106.

In the active state, instead of during the recovery processing from the hibernate state, the write completion notification is transmitted to the host computer 200 immediately after the system controller 107 writes the data into the cache memory 106 upon reception of the write command. Therefore, at a time instant T1' in FIG. 3, the system controller 107 transmits the write completion notification to the host computer 200.

Meanwhile, in the first embodiment of this invention, even if the writing of the data into the cache memory 106 is completed, the issuance of the write completion notification is held. Then, when the deviation (difference ΔFr) of the rotational speed measurement value Fr of the optical disc 101 from the target rotational speed tFr becomes equal to or smaller than the predetermined ratio Rth at a time instant T2, the system controller 107 transmits the write completion notification held at the time instant T1' to the host computer 200. Therefore, in the recovery processing from the hibernate state according to the first embodiment of this invention, the timing at which the system controller 107 transmits the write completion notification is delayed by a time of T2−T1'. Here, the time that passes since the suspend state ends until the deviation (difference ΔFr) of the rotational speed measurement value Fr of the optical disc 101 from the target rotational speed tFr becomes equal to or smaller than the predetermined ratio Rth is set to approximately half of the time that passes since the suspend state ends until the steady-state rotation state is achieved as described with reference to FIG. 4. The above-mentioned time is thus set to a time that is sufficiently shorter than the time-out period for the write processing of the host computer 200, thereby preventing the time-out from occurring on the host computer 200 even if the write completion notification is delayed.

The host computer 200 that receives the write completion notification at the time instant T2 can perform the next processing because the write processing has been completed. The host computer 200 transmits the read command at a time instant T3.

After transmitting the write completion notification in the recovery processing from the hibernate state, the system controller 107 of the optical disc drive 100 is ready to receive the second command during a period until the actual write processing is completed. In the example of FIG. 3, the host computer 200 issues the read command at the time instant T3, and the system controller 107 receives the issued read command as the second command.

If judging at the time instant T4 that the rotational speed measurement value Fr of the optical disc 101 has achieved the steady-state rotation state, the system controller 107 starts the write processing, and completes the write processing at a time instant T5.

Subsequently, at a time instant T6, the system controller 107 executes the read command that is the second command received at the time instant T3 after the write completion notification is issued. Upon completion of the read command, the system controller 107 transmits a read completion notification to the host computer 200 at a time instant T7.

Accordingly, on the optical disc drive 100 according to the first embodiment of this invention, by delaying the write completion notification by the time of T2−T1' after the recovery from the hibernate state, it is possible to cause a time of T7−T3 between the reception of the read command and the transmission of the read completion notification to fall within such a range that the time-out does not occur on the host computer 200.

In addition, the ratio Rth for judging the deviation of the rotational speed measurement value Fr from the target rotational speed tFr is set so that the time by which the write completion notification is delayed becomes approximately half of the time that passes since the optical disc 101 recovers from the suspend state until achieving the steady-state rotation state, which can reduce influences of variations (individual differences) based on precision or the like in mechanical parts of the optical disc drive 100.

It should be noted that after the time instant T7 at which the recovery processing from the hibernate state is completed, as indicated by time instants T8 and T9, the system controller 107 receives the write command and then transmits the write completion notification to the host computer 200 at the time when the writing of the data into the cache memory 106 is completed. Thus, the system controller 107 notifies the host computer 200 of the write completion before the actual write processing is completed, which can improve processing speed of the writing onto the optical disc drive 100 from the viewpoint of the host computer 200.

Figure 5:
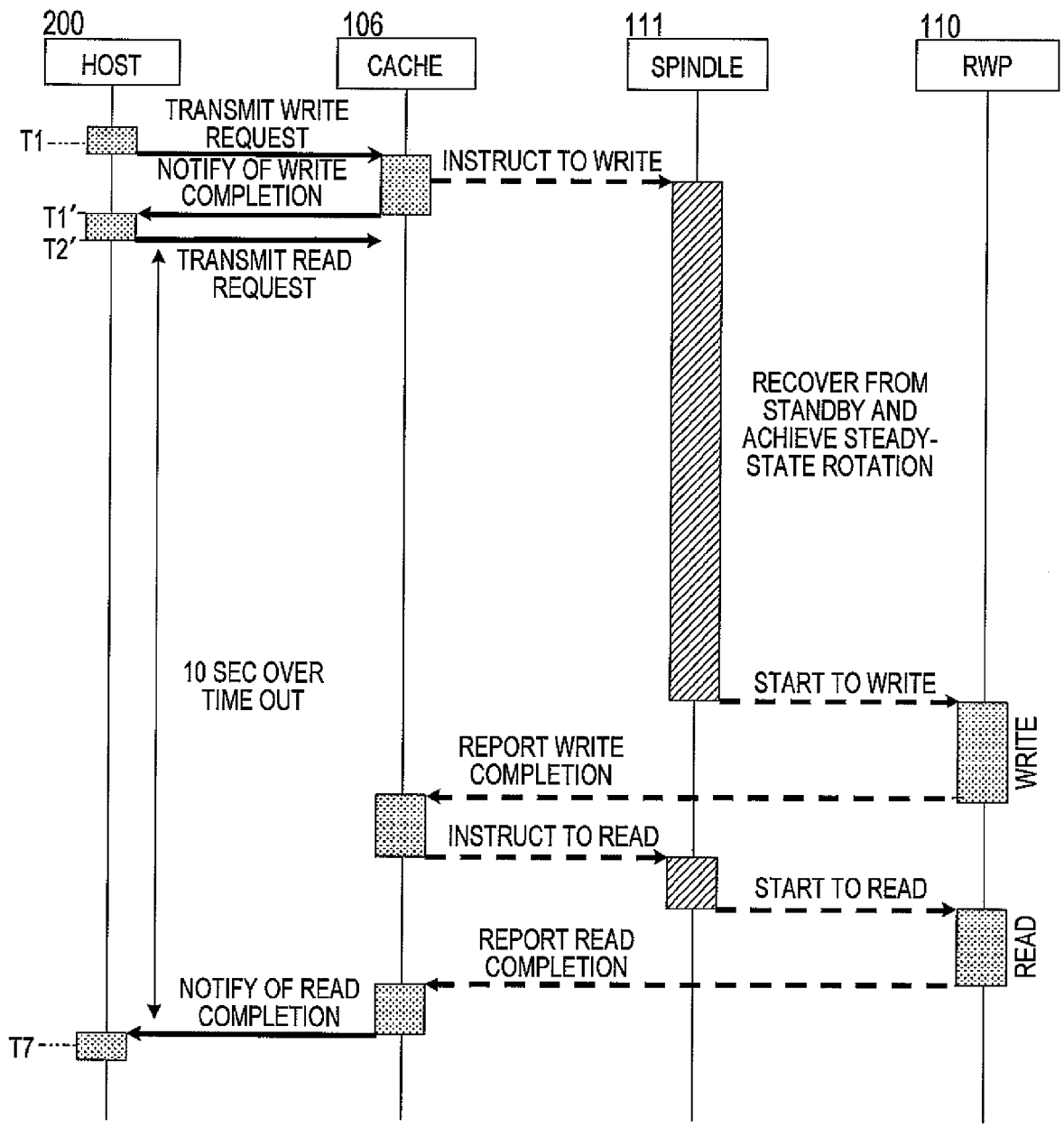
FIG. 5 is a sequential diagram illustrating a case where the optical disc drive recovers from the hibernate state upon reception of the write command and receives the read command as the second command during the recovery processing from the hibernate state in the same manner as in the conventional example.

FIG. 5 is a sequential diagram illustrating a case where the optical disc drive 100 recovers from the hibernate state upon reception of the write command and receives the read command as the second command during the recovery processing from the hibernate state in the same manner as in the conventional example.

When the optical disc drive 100 is in the hibernate state, the host computer 200 transmits the write command at the time instant T1. Upon reception of the write command, the system controller 107 recovers from the hibernate state, and causes the respective components in the hibernate state to shift to the active state. The system controller 107 instructs the spindle driver unit 130 to cause the stopped optical disc 101 to start rotating at the target rotational speed tFr. Further, the system controller 107 receives the data corresponding to the write command from the host computer 200, and writes the data into the cache memory 106.

In the above-mentioned conventional example, the write completion notification is transmitted to the host computer 200 at the time instant T1' at which the writing into the cache memory 106 is completed. Accordingly, the host computer 200 can transmit the read command that is the second command at a time instant T2'.

A time that passes since the optical disc 101 starts to rotate until the steady-state rotation state is achieved and the actual writing and a read processing corresponding to the second command are completed is the same as the time between the time instants T1 and T7 illustrated in FIG. 3 according to the first embodiment of this invention. However, in the conventional example, the time that passes since the host computer 200 issues the read command until the read completion notification is received becomes a time of T7−T2', which exceeds the time-out period of the host computer 200 and causes the time-out.

Meanwhile, according to the first embodiment of this invention, by holding the write completion notification during the recovery processing from the hibernate state even if the processing for writing the data to be written into the cache memory 106 is completed and by delaying the write completion notification until the rotational speed measurement value Fr of the optical disc 101 reaches the predetermined ratio with respect to the target rotational speed tFr, it is possible to delay a timing for receiving the second command received by the system controller 107 after the recovery from the hibernate state.

Consequently, according to the first embodiment of this invention, it is possible to reliably prevent the time-out from occurring on the host computer 200 in the processing of the second command during the recovery processing from the hibernate state.

Second Embodiment

Figure 6:
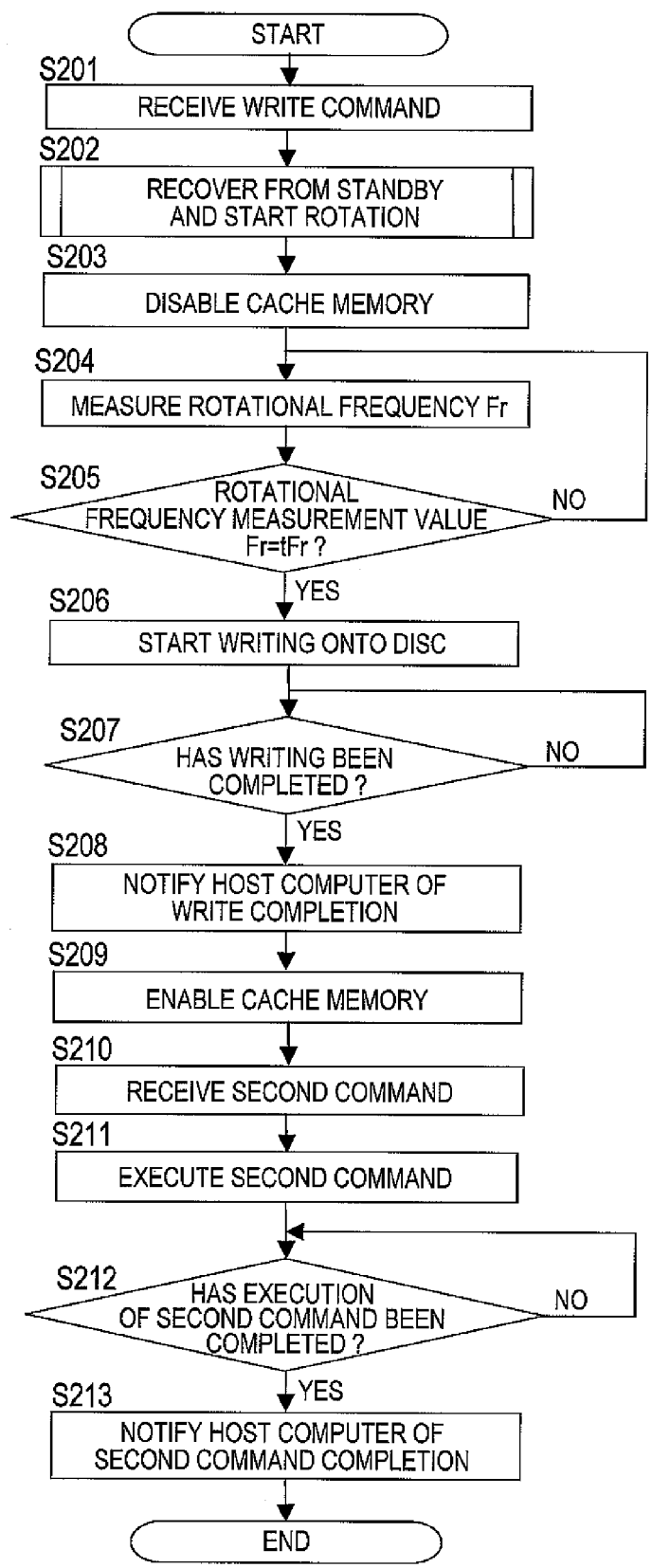
FIG. 6 is a flowchart illustrating an example of the control performed mainly by the system controller according to a second embodiment of this invention.
Figure 7:
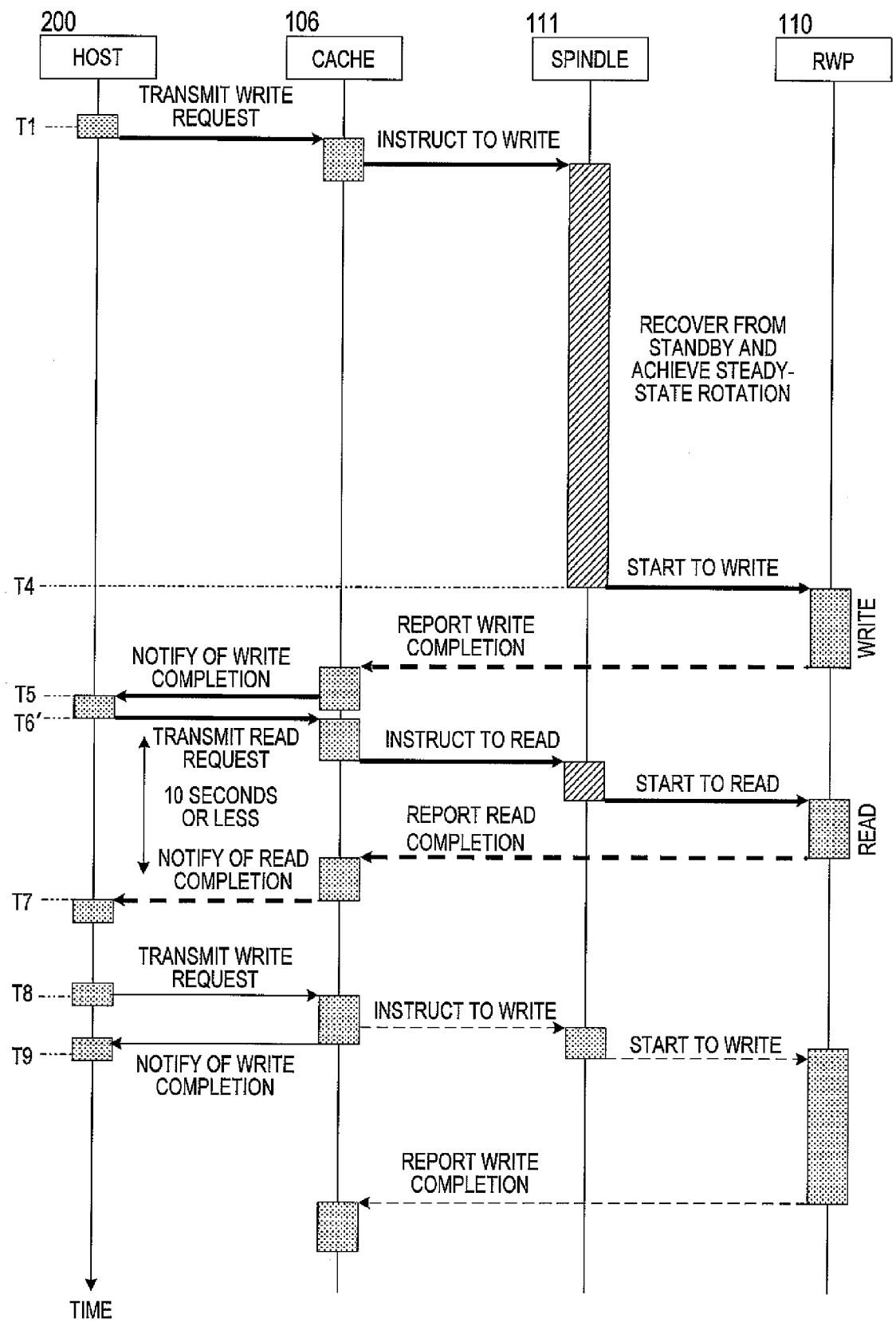
FIG. 7 is a sequential diagram illustrating an example of operations of the host computer 200 and the optical disc drive 100 according to the second embodiment of this invention.

FIGS. 6 and 7 illustrate a second embodiment in which the delay of the write completion notification during the recovery processing from the hibernate state, which is described in the first embodiment, is realized by disabling the cache memory 106. The optical disc drive 100 has the same configuration as that of the first embodiment illustrated in FIG. 1 except that the processing performed by the system controller 107 is different.

In the second embodiment, in the recovery processing from the hibernate state, the write processing of a first command (write command) is performed with the cache memory 106 disabled, and at the time when the write processing is completed, the, completion notification is transmitted to the host computer 200, after which the cache memory 106 is enabled to perform a normal read/write processing.

FIG. 6 is a flowchart illustrating an example of the control performed mainly by the system controller 107 when the optical disc drive 100 shifts from the hibernate state to the active state. The example of FIG. 6 indicates a case where the optical disc drive 100 recovers into the active state upon reception of the write command from the host computer 200 and receives the read command as the second command from the host computer 200 after the notification of the write completion.

In Steps S201 and S202, in the same manner as in Steps S101 and S102 of the first embodiment illustrated in FIG. 2, the external interface 105 of the optical disc drive 100 receives a write command from the host computer 200, and the system controller 107 is caused to shift from the hibernate state to the active state, and instructs the spindle driver unit 130 to cause the optical disc 101 to recover from the suspend state and rotate at the preset target rotational speed tFr.

In Step S203, the system controller 107 disables the cache memory 106, and carries out the first write processing during the recovery processing from the hibernate state without using the cache memory 106.

In Step S204, the spindle driver unit 130 measures the rotational speed (or rotational frequency) under the above-mentioned servo control, and the system controller 107 acquires from the spindle driver unit 130 the measurement value of the rotational speed of the optical disc 101 as the rotational speed measurement value Fr.

In Step S205, the system controller 107 judges whether or not the rotational speed measurement value Fr acquired above has reached the target rotational speed tFr. As to whether or not the rotational speed measurement value Fr of the optical disc drive 100 has reached the target rotational speed tFr, it is judged that the steady-state rotation (stable rotation) state in which the target rotational speed tFr is reached has been achieved if the rotational speed measurement value Fr is within the predetermined error range (for example, ±1%) with respect to the target rotational speed tFr, and the system controller 107 advances to the processing of Step S206. On the other hand, if the rotational speed measurement value Fr is not within the predetermined error range (for example, ±1%) with respect to the target rotational speed tFr, the system controller 107 returns to Step S204 and repeatedly monitors the rotational speed measurement value Fr until the target rotational speed tFr is reached.

In Step S206 in which the rotational speed measurement value Fr of the optical disc 101 achieves the steady-state rotation state, the system controller 107 instructs the laser driver circuit 110 to start the writing, receives data from the host computer 200, and writes the data onto the optical disc 101.

In Step S207, the system controller 107 judges whether or not all the data received from the host computer 200 has been written onto the optical disc 101, and continues monitoring until the writing onto the optical disc 101 is completed. When the writing is completed, the system controller 107 advances to Step S208.

In Step S208, the system controller 107 transmits the completion of the write processing to the host computer 200 because the write processing of the data received from the host computer 200 has been completed.

Subsequently, in Step S209, the system controller 107 sets the cache memory 106 to an on (enabled) state. In Step S210, the system controller 107 receives the second command. Here, the example in which the read command is received as the second command is illustrated.

Steps S210 through S213 are the same as the steps performed in the normal active state. In other words, in Step S211, the received second command (read command) is executed, and the data of the optical disc 101 is written into the cache memory 106 and transmitted to the host computer 200. In Step S212, the system controller 107 judges whether or not a read request from the host computer 200 has been completed. At the time when the read request is completed, the read completion notification is transmitted to the host computer 200.

The operations of the host computer 200 and the optical disc drive 100 performed by the above-mentioned processing are as illustrated by a sequential diagram in FIG. 7. FIG. 7 is the sequential diagram illustrating the case where the optical disc drive 100 recovers from the hibernate state upon reception of the write command, and receives the read command as the second command during the recovery processing from the hibernate state.

When the optical disc drive 100 is in the hibernate state, the host computer 200 transmits the write command at the time instant T1. Upon reception of the write command, the system controller 107 recovers from the hibernate state, and causes the respective components in the hibernate state to shift to the active state. The system controller 107 instructs the spindle driver unit 130 to cause the stopped optical disc 101 to start rotating at the target rotational speed tFr.

Further, the system controller 107 sets the cache memory 106 in an off state, and causes the host computer 200 to stand by for the transfer of the data to be written until the time instant T4 at which the optical disc 101 achieves the steady-state rotation state.

At the time instant T4 at which the steady-state rotation state is achieved, the system controller 107 starts writing the data onto the optical disc 101. Therefore, the host computer 200 transmits the data to the system controller 107 via the external interface 105 to thereby perform the writing thereof onto the optical disc 101. At the time instant T5 at which the writing onto the optical disc 101 is completed, the system controller 107 transmits the write completion notification to the host computer 200. The host computer 200 executes the write processing until the time instant T5 while transferring the data because the cache memory 106 is off.

After the completion of the write processing, the cache memory 106 is enabled, and the optical disc drive 100 is shifted to the normal active state. Then, upon reception of the read command at the time instant T6, the system controller 107 executes the read processing by using the cache memory 106, and issues the read completion notification at the time instant T7 at which the reading is completed.

After the time instant T7 at which the cache memory 106 is enabled, upon reception of the write command, as indicated by the time instants T8 and T9, the system controller 107 receives the write command and then transmits the write completion notification to the host computer 200 at the time when the writing of the data to be written into the cache memory 106 is completed.

As described above, according to the second embodiment, by performing the recovery processing from the hibernate state with the cache memory 106 disabled, delaying the timing for becoming ready to receive the second command until the processing of the first command is completed, and switching the cache memory 106 to an on state to receive the second command, it is possible to prevent the time-out from occurring on the host computer 200 in the processing corresponding to the second command received during the recovery processing from the hibernate state.

It should be noted that the example of FIGS. 6 and 7 indicates the case where the cache memory 106 is off until the end of the write command issued from the host computer 200, but the system controller 107 may switch the cache memory 106 from the off state to the on state midway through the write processing.

For example, the optical disc drive 100 may be configured so that the write command is received, the cache memory 106 is disabled with regard to a predetermined number of blocks, the write processing is performed, and after the write processing of the predetermined number of blocks is completed, the cache memory 106 is set in an on state and used to perform the write processing of the remaining blocks. Then, the cache memory 106 may transmit the write completion notification to the host computer 200 at a time when the writing of the remaining blocks is completed. Also in this case, it is possible to delay the write completion notification to be transmitted to the host computer 200 during a period during which the cache memory 106 is off, and to prevent the time-out from occurring on the host computer 200 in the processings to the first command and second commands.

It should be noted that the above-mentioned respective embodiments indicate the example in which the optical disc drive 100 includes the cache memory 106 as a memory area for temporarily storing the data to be written onto the optical disc 101 or the data read from the optical disc 101, but a cache area may be provided within the memory 108 used by the system controller 107.

While the present invention has been described in detail and pictorially in the accompanying drawings, the present invention is not limited to such detail but covers various obvious modifications and equivalent arrangements, which fall within the purview of the appended claims.

What is claimed is:

1. An optical disc drive, comprising:
a controller for controlling access to an optical disc; and
an actuator for driving the optical disc by being controlled by the controller,
the controller comprising:
an interface for performing one of transmitting and receiving a command issued from external and data;
a temporary memory unit for temporarily storing the data;
a rotation control unit for controlling the actuator;
an optical control unit for performing one of writing to the optical disc and reading from the optical disc;
a processor for controlling the interface, the temporary memory unit, the rotation control unit, and the optical control unit; and
a hibernation control unit for controlling the processor to shift to a hibernate state when a predetermined condition is satisfied and controlling the processor to recover from the hibernate state into an active state when the interface receives a first command, wherein:
the hibernation control unit controls the processor to recover into the active state when the processor is in the hibernate state and the interface receives the first command; and
the processor is configured to:
receive the first command from the interface and instruct the rotation control unit to drive the optical disc at a predetermined target rotational speed;
instruct the optical control unit to perform one of the read and write specified by the first command;
transmit a completion notification of the first command to the interface with a delay; and
receive a second command after transmitting the delayed completion notification of the first command and instruct the optical control unit to perform one of the read and write specified by the second command.

2. The optical disc drive according to claim 1, wherein the processor is configured to:
receive the first command from the interface and store data specified by the first command into the temporary memory unit;
instruct the rotation control unit so that a rotational speed of the optical disc becomes the predetermined target rotational speed;
transmit the completion notification of the first command to the interface when a rotation state of the optical disc becomes a predetermined rotation state;
detect the rotational speed of the optical disc and instruct the optical control unit to execute one of the read and write specified by the first command by using the data stored in the temporary memory unit when the detected rotational speed reaches the predetermined target rotational speed;
receive the second command from the interface after outputting the delayed completion notification of the first command to the interface; and
instruct the optical control unit to perform one of the read and write specified by the second command after one of the read and write specified by the first command is completed.

3. The optical disc drive according to claim 2, wherein:
the first command comprises a write command;
the second command comprises a read command; and
the processor transmits a completion notification of the second command to the interface when control specified by the second command is completed.

4. The optical disc drive according to claim 2, wherein the processor detects the rotational speed of the optical disc, judges that the rotation state of the optical disc becomes the predetermined rotation state when the detected rotational speed reaches a predetermined ratio with respect to the target rotational speed, and transmits the completion notification of the first command to the interface.

5. The optical disc drive according to claim 2, wherein the processor instructs the rotation control unit to start rotation of the optical disc when the interface receives the first command.

6. The optical disc drive according to claim 1, wherein, the processor writes data specified by the second command into the temporary memory unit in a case where the second command is a write command and transmits a write completion notification to the interface when the writing is completed.

7. The optical disc drive according to claim 1, wherein the processor is configured to:
receive the first command from the interface and instruct the rotation control unit so that the rotational speed of the optical disc becomes the predetermined target rotational speed;
disable the temporary memory unit;
detect the rotational speed of the optical disc, receive the data specified by the first command when the detected rotational speed reaches the predetermined target rotational speed, and instruct the optical control unit to perform one of the read and write specified by the first command;
transmit the completion notification of the first command to the interface when one of the read and write specified by the first command is completed;
enable the temporary memory unit after outputting the completion notification of the first command to the interface and receive the second command from the interface; and
instruct the optical control unit to perform one of the read and write specified by the second command.

8. A hibernation recovery method for an optical disc drive, the optical disc drive comprising:
a controller for controlling access performed to an optical disc; and
an actuator for driving the optical disc by being controlled by the controller,
the controller comprising:
an interface for performing one of transmitting and receiving a command issued from external and data;
a temporary memory unit for temporarily storing the data;
a rotation control unit for controlling the actuator;
an optical control unit for performing one of writing to the optical disc and reading from the optical disc;
a processor for controlling the interface, the temporary memory unit, the rotation control unit, and the optical control unit; and
a hibernation control unit for controlling the processor to shift to a hibernate state when a predetermined condition is satisfied and controlling the processor to recover from the hibernate state into an active state when the interface receives a first command, the method comprising controlling the controller to recover from the hibernate state and further comprising:
controlling, by the hibernation control unit, the processor to recover into the active state when the processor is in the hibernate state and the interface receives the first command;
receiving, by the processor, the first command from the interface and instructing the rotation control unit to drive the optical disc at a predetermined target rotational speed;
instructing, by the processor, the optical control unit to perform one of the read and write specified by the first command;
transmitting, by the processor, a completion notification of the first command to the interface with a delay; and
receiving, by the processor, a second command after transmitting the delayed completion notification of the first command and instructing the optical control unit to perform one of the read and write specified by the second command.

9. The hibernation recovery method for an optical disc drive according to claim 8, wherein:
the receiving, by the processor, the first command from the interface and instructing the rotation control unit to drive the optical disc at a predetermined target rotational speed comprises:
receiving, by the processor, the first command from the interface and storing data specified by the first command into the temporary memory unit; and
instructing, by the processor, the rotation control unit so that a rotational speed of the optical disc becomes the predetermined target rotational speed;
the transmitting, by the processor, a completion notification of the first command to the interface with a delay comprises transmitting, by the processor, the completion notification of the first command to the interface when a rotation state of the optical disc becomes a predetermined rotation state;
the instructing, by the processor, the optical control unit to perform one of the read and write specified by the first command comprises instructing, by the processor, the optical control unit to perform one of the read and write specified by the first command by using the data stored in the temporary memory unit when the rotational speed of the optical disc reaches the predetermined target rotational speed; and
the receiving, by the processor, a second command after transmitting the delayed completion notification of the first command and instructing the optical control unit to perform one of the read and write specified by the second command comprises:
receiving, by the processor, the second command from the interface after issuing the completion notification of the first command; and
instructing, by the processor, the optical control unit to perform one of the read and write specified by the second command after one of the read and write specified by the first command is completed.

10. The hibernation recovery method for an optical disc drive according to claim 9, wherein:
the first command comprises a write command;
the second command comprises a read command; and
the hibernation recovery method for an optical disc drive further comprises issuing, by the processor, a completion notification of the second command to the interface when one of the read and write specified by the second command is completed.

11. The hibernation recovery method for an optical disc drive according to claim 9, wherein the transmitting, by the processor, the completion notification of the first command to the interface when a rotation state of the optical disc becomes a predetermined rotation state comprises detecting, by the processor, the rotational speed of the optical disc, and issuing the completion notification of the first command to the interface when the detected rotational speed reaches a predetermined ratio with respect to the target rotational speed.

12. The hibernation recovery method for an optical disc drive according to claim 9, wherein the instructing, by the processor, the rotation control unit so that a rotational speed of the optical disc becomes the predetermined target rotational speed comprises instructing, by the processor, start of rotation of the optical disc when the interface receives the first command.

13. The hibernation recovery method for an optical disc drive according to claim 9, further comprising writing, by the processor, data specified by the second command into the temporary memory unit in a case where the second command is a write command and transmiting a write completion notification to the interface when the writing is completed.

14. The hibernation recovery method for an optical disc drive according to claim 8, wherein:
   the instructing, by the processor, the optical control unit to perform one of the read and write specified by the first command comprises:
      disabling, by the processor, the temporary memory unit; and
      detecting, by the processor, the rotational speed of the optical disc, receiving the data specified by the first command when the detected rotational speed reaches the predetermined target rotational speed, and instructing the optical control unit to perform one of the read and write specified by the first command;
   the transmitting, by the processor, a completion notification of the first command to the interface with a delay comprises transmitting, by the processor, the completion notification of the first command to the interface when one of the read and write specified by the first command is completed; and
   the receiving, by the processor, a second command after transmitting the delayed completion notification of the first command and instructing the optical control unit to perform one of the read and write specified by the second command comprises:
      enabling, by the processor, the temporary memory unit after outputting the completion notification of the first command to the interface and receiving the second command from the interface; and
      instructing, by the processor, the optical control unit to perform one of the read and write specified by the second command.

* * * * *